United States Patent
Nishikawa et al.

(10) Patent No.: US 9,371,974 B2
(45) Date of Patent: Jun. 21, 2016

(54) LIGHTING DEVICE, LIGHT FIXTURE, AND VEHICLE

(71) Applicant: Panasonic Corporation, Osaka (JP)

(72) Inventors: Masahiro Nishikawa, Niigata (JP);
Tomoyuki Nakano, Osaka (JP);
Masatoshi Ueno, Osaka (JP); Masashi Kichima, Niigata (JP); Kazuya Kato, Niigata (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/460,602

(22) Filed: Aug. 15, 2014

(65) Prior Publication Data
US 2015/0062951 A1     Mar. 5, 2015

(30) Foreign Application Priority Data
Sep. 3, 2013   (JP) .................................. 2013-182545

(51) Int. Cl.
| | |
|---|---|
| *F21V 23/02* | (2006.01) |
| *F21S 8/10* | (2006.01) |
| *B60Q 1/00* | (2006.01) |
| *H05B 33/08* | (2006.01) |

(52) U.S. Cl.
CPC ............... *F21S 48/00* (2013.01); *B60Q 1/0094* (2013.01); *H05B 33/0803* (2013.01)

(58) Field of Classification Search
CPC .......... F21V 23/026; F21V 17/08; F21S 48/00
See application file for complete search history.

(56) References Cited

U.S. PATENT DOCUMENTS

| | | | |
|---|---|---|---|
| 6,513,230 B2 | 2/2003 | Inoue et al. | |
| 6,690,256 B2 | 2/2004 | Ohashi et al. | |
| 6,775,141 B2 | 8/2004 | Yoshida et al. | |
| 2002/0109572 A1 | 8/2002 | Inoue et al. | |
| 2002/0158742 A1 | 10/2002 | Ohashi et al. | |
| 2003/0161111 A1 | 8/2003 | Yoshida et al. | |
| 2011/0037405 A1* | 2/2011 | Suganuma | H01F 27/2804 315/276 |
| 2012/0081202 A1* | 4/2012 | Nanayakkara | H01F 19/04 336/200 |
| 2012/0161911 A1* | 6/2012 | Moiseev | H01F 27/2804 336/55 |
| 2012/0195005 A1* | 8/2012 | Asano | H01F 27/22 361/710 |

FOREIGN PATENT DOCUMENTS

| | | |
|---|---|---|
| JP | 2002-246236 | 8/2002 |
| JP | 2002-329614 | 11/2002 |
| JP | 2003-244959 | 8/2003 |
| JP | 2005-175064 | 6/2005 |
| JP | 2010-178439 | 8/2010 |
| JP | 2011-233595 | 11/2011 |

* cited by examiner

*Primary Examiner* — Elmito Breval
(74) *Attorney, Agent, or Firm* — Renner, Otto, Boisselle & Sklar, LLP

(57) ABSTRACT

A lighting device includes: a circuit board placed on a base; and a transformer provided in the circuit board. The transformer includes: a winding pattern formed on the circuit board; and a core having an outer leg portion. The circuit board has an outer leg insertion portion through which the outer leg portion of the core is inserted, and the circuit board and the base have therebetween a gap which is air space. The base and at least a lateral face of the outer leg portion are bonded together by a first resin that is insertable from the outer leg insertion portion.

12 Claims, 15 Drawing Sheets

LIGHTING DEVICE, LIGHT FIXTURE, AND VEHICLE

CROSS REFERENCE TO RELATED APPLICATION

This application claims the benefit of priority of Japanese Patent Application Number 2013-182545, filed Sep. 3, 2013, the entire content of which is hereby incorporated by reference.

TECHNICAL FIELD

The disclosure relates to a lighting device, a light fixture including the same, and a vehicle including the light fixture.

BACKGROUND ART

Conventionally, a lighting device (lighting circuit) is used for controlling lighting of a light source. For example, in a light fixture, such as a headlight, in vehicles such as automobiles, a high intensity discharge (HID) lamp is provided as a light source, and a lighting device (ballast) is provided for controlling the lighting of the HID lamp.

As lighting devices are being miniaturized and made thinner, electronic components mounted onto circuit boards (printed boards) of lighting devices are also progressively being miniaturized and made thinner in recent years. For example, with regard to transformers which are one of the electronic components of lighting devices, there is a trend towards replacing transformers configured by winding copper wires around a bobbin with thin sheet transformers.

Sheet transformers include, for example, winding patterns such as a primary coil and a secondary coil formed on plural layers of a circuit board, and a core attached to the circuit board (see Unexamined Japanese Patent Application Publication No. 2010-178439).

SUMMARY

However, when a circuit board provided with a sheet transformer is to be bonded to a base such as a circuit case, there is the problem that, when the circuit board is placed on the base, it is difficult to bond the circuit board and the base.

The present invention is conceived in order to solve the aforementioned problem and has as an object to provide a lighting device which allows easy bonding of a circuit board and a base.

In order to achieve the aforementioned object, a lighting device according to an aspect of the present invention includes: a circuit board placed on a base; and a transformer provided in the circuit board, wherein the transformer includes a winding pattern and a core, the winding pattern being formed on the circuit board, and the core having an outer leg portion, the circuit board has an outer leg insertion portion through which the outer leg portion of the core is inserted, the circuit board and the base have therebetween a gap which is air space, and the base and at least a lateral face of the outer leg portion are bonded together by a first resin that is insertable from the outer leg insertion portion.

Furthermore, in a lighting device according to an aspect of the present invention, the outer leg portion may consist of a pair of outer leg portions, the outer leg insertion portion may consist of a pair of outer leg insertion portions through which the pair of outer leg portions are respectively inserted, and the first resin may bond together the base and a surface of one outer leg portion of the pair of outer leg portions, and may be disposed on a surface of the core, from the one outer leg portion to a point up to an other outer leg portion of the pair of outer leg portions.

In addition, in a lighting device according to an aspect of the present invention, the core may have a central leg portion located between the pair of outer leg portions, and the first resin may be disposed on the surface of the core, from the one outer leg portion to a point up to the central leg portion.

Furthermore, in a lighting device according to an aspect of the present invention, the base and a lateral face of the other outer leg portion may be bonded together by a second resin that is insertable from one of the pair of outer leg insertion portions which corresponds to the other outer leg portion, and the second resin may be disposed on the surface of the core, from the other outer leg portion to a point up to the one outer leg portion.

Furthermore, in a lighting apparatus according to an aspect of the present invention, the outer leg insertion portion may be a hole penetrating through the circuit board.

Furthermore, in a lighting apparatus according to an aspect of the present invention, the outer leg insertion portion may be a notch formed by cutting out a portion of an outer edge of the circuit board.

Furthermore, in a lighting apparatus according to an aspect of the present invention, the notch may be formed by cutting out a corner portion of the circuit board.

Furthermore, in a lighting apparatus according to an aspect of the present invention, the first resin may be further disposed between a bottom face of the core and a top face of the base.

Furthermore, a light fixture according to an aspect of the present invention includes: any one of the above-described lighting devices; a housing; and a light source housed inside the housing and whose lighting is controlled by the lighting device.

Furthermore, a vehicle according to an aspect of the present invention includes: the above-described light fixture; and a vehicle body.

According to the present invention, the circuit board and the base can be bonded together easily.

BRIEF DESCRIPTION OF THE DRAWINGS

The figures depict one or more implementations in accordance with the present teaching, by way of examples only, not by way of limitations. In the figures, like reference numerals refer to the same or similar elements.

DETAILED DESCRIPTION

Hereinafter, exemplary embodiments of the present invention will be described with reference to the drawings. It should be noted that each of the subsequently-described embodiments show a specific preferred example of the present invention. Therefore, numerical values, shapes, materials, structural components, the arrangement and connection of the structural components, as well as steps and the sequence of the steps, etc. shown in the following exemplary embodiments are mere examples, and are not intended to limit the scope of the present invention. Furthermore, among the structural components in the following exemplary embodiment, components not recited in any one of the independent claims which indicate the broadest concepts of the present invention are described as arbitrary structural components.

It should be noted that the respective figures are schematic diagrams and are not necessarily precise illustrations. Furthermore, in the respective figures, substantially identical components are assigned the same reference signs, and overlapping description is omitted or simplified.

Embodiment 1

Figure 1A:
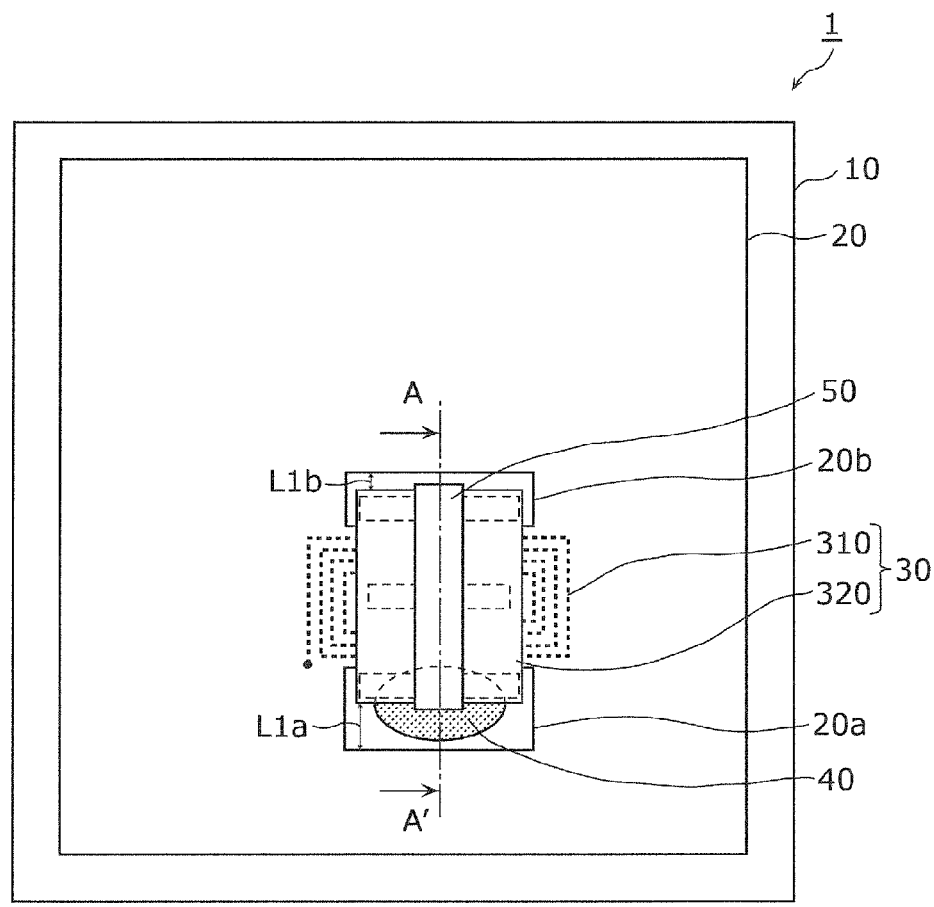
FIG. 1A is a plan view of a lighting device according to Embodiment 1 of the present invention.
Figure 1B:
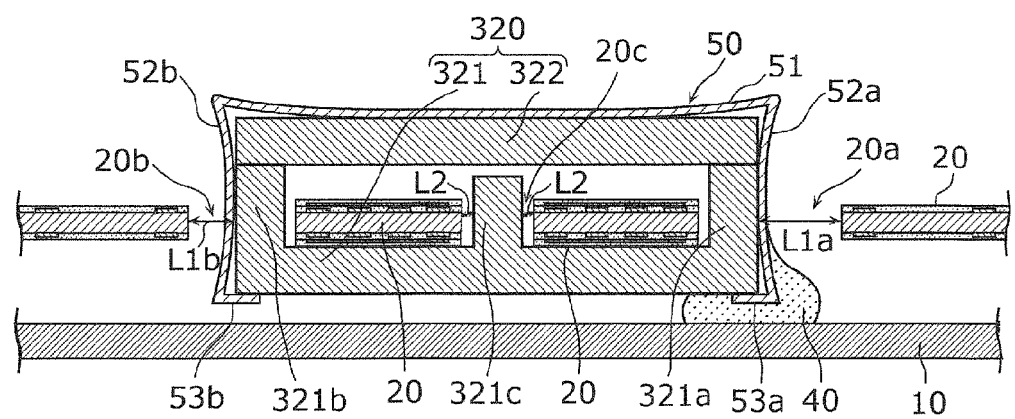
FIG. 1B is a cross-sectional view of a lighting device according to Embodiment 1 of the present invention at line A-A' in FIG. 1A.
Figure 2:
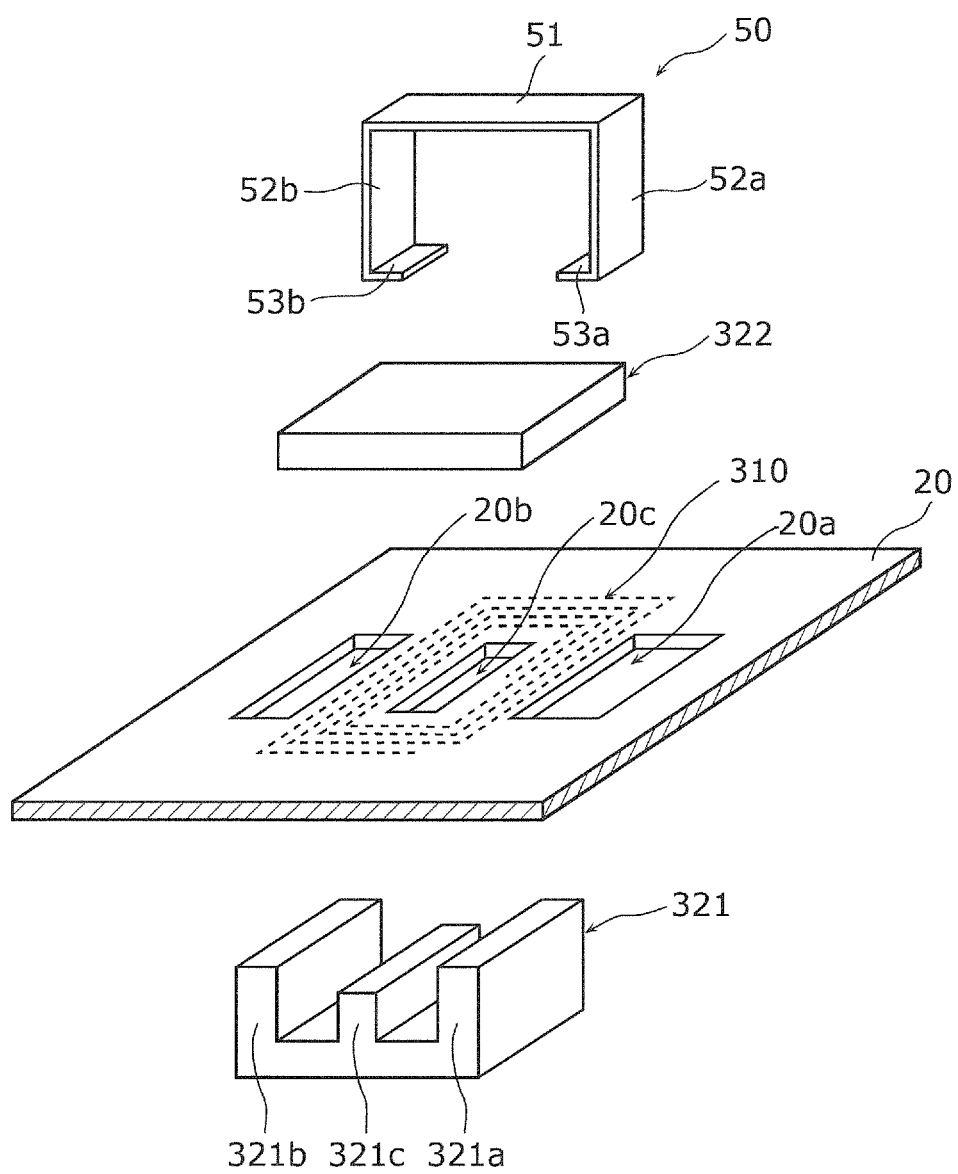
FIG. 2 is an exploded prospective view of a vicinity of a transformer in a lighting device according to Embodiment 1 of the present invention.

First, a configuration of a lighting device 1 according to Embodiment 1 of the present invention will be described using FIG. 1A, FIG. 1B, and FIG. 2. FIG. 1A is a plan view of the lighting device 1 according to Embodiment 1 of the present invention. FIG. 1B is a cross-sectional view of the lighting device at line A-A' in FIG. 1A. FIG. 2 is an exploded prospective view of the vicinity of a transformer in the lighting device 1 according to Embodiment 1 of the present invention. It should be noted that, in FIG. 1A, only the configuration in the vicinity of the transformer is illustrated, and electronic components other than the transformer are omitted.

The lighting device according to this embodiment is a lighting device (ballast) for turning ON an HID lamp such as a metal halide lamp used as a light source of a vehicle light fixture for example, and includes, as illustrated in FIG. 1A, FIG. 1B, and FIG. 2, a base 10, a circuit board 20 placed on the base 10, a transformer 30 provided in the circuit board 20, and a resin 40 for fixing the core of the transformer 30 to the base 10. In addition, the lighting device 1 includes a spring component 50 which secures in an integrated manner a core 320 which consists of plural parts.

Hereinafter, the respective constituent components of the lighting device 1 will be described in detail.

(Base)

The base 10 is an placement base for placing the circuit board 20, and is for example a circuit case (housing). The base 10, which is a circuit case, is configured of, for example, a box-shaped case body and a case cover which is a cover of the case body. In this case, the circuit board 20 is placed on the bottom of the case body.

The base 10 can be formed using a metal material such as aluminum or stainless steel. For example, a base 10 having a predetermined shape can be formed by performing press work on a metal plate.

It should be noted that the material of the base 10 is not limited to a metal material, and a resin material may be used. Furthermore, the shape of the base 10 is not limited to being box-like, and may be board-like, and so on.

(Circuit Board)

As illustrated in FIG. 1B, the circuit board 20 is disposed separated from the base 10 by a gap. In other words, a gap, which is air space, is present between the circuit board 20 and the base 10. This gap is not filled-in by the resin 40. By placing the circuit board 20 on a projecting portion (not shown) which projects from the circuit board 20-side of the base 10 for example, a gap can be provided between the circuit board 20 and portions of the base 10 other than the projecting portion. It should be noted that, aside from the projecting portion provided in the base 10, a spacer (not shown) which is a different component from the base 10 may be used. Furthermore, the projecting portion or spacer may be provided at any position between the base 10 and the circuit board 20. For example, when provided near the vicinity of the outer edge of the circuit board 20, the projecting portion or spacer does not interfere with a later-described electronic components to be mounted on the circuit board 20, thereby allowing effective space utilization.

Furthermore, the gap (air space) between the circuit board 20 and the base 10 can be provided without using a projecting portion or a spacer. For example, when the resin 40 flows out between the circuit board 20 and the base 10, a gap is provided between the circuit board 20 and the base 10. In other words, there are cases where the resin 40 is present between the circuit board 20 and the base 10, and so it is not necessarily true that the resin 40 is not formed between the circuit board 20 and the base 10. However, even when the resin 40 flows out between the circuit board 20 and the base 10, the entire area between the circuit board 20 and the base 10 is not filled in by the resin 40, and at least a gap (air space) where the resin 40 is absent is present between the circuit board 20 and the base 10.

Electronic components including the transformer 30 are mounted on the circuit board 20. Furthermore, the circuit board 20 is a printed wiring board, and metal wiring for electrically connecting the respective electronic components is formed by patterning on the surface of the circuit board 20.

Aside from the transformer 30, the electronic components include, for example, a resistor, a capacitor, a coil, a transistor, or a diode.

The transformer 30 and the electronic components make up an electronic circuit such as a DC/DC converter or an inverter, for controlling the lighting of an HID lamp.

The circuit board 20 is provided with insertion portions through which leg portions provided in a first core 321 of the core 320 are inserted. Specifically, as illustrated in FIG. 2, the circuit board 20 has a first outer leg insertion portion 20a through which a first outer leg portion 321a is inserted, a second outer leg insertion portion 20b through which a second outer leg portion 321b is inserted, and central leg insertion portion 20c through which a central leg portion 321c is inserted. In other words, a pair of insertion portions (the first outer leg insertion portion 20a and the second outer leg insertion portion 20b) and the central leg insertion portion 20c provided between the pair of insertion portions are provided in the circuit board 20.

In this embodiment, each of the first outer leg insertion portion 20a, the second outer leg insertion portion 20b, and the central leg insertion portion 20c is a through hole which penetrates through the circuit board 20 in the thickness direction. The through holes have a rectangular plan view shape, and the lengthwise and crosswise dimensions of the opening of the through holes are such that the edge of each through hole does not come into contact with a corresponding leg portion when the respective leg portions of the first core 321 are inserted.

It should be noted that the shape of the opening of the through hole of the first outer leg insertion portion 20a, the second outer leg insertion portion 20b, and the shape of the central leg insertion portion 20c is not limited to being rectangular, and may be circular, oval, or elliptic. Furthermore, it is preferable to match the shape of the openings of the through holes to the shape of the leg portions of the first core 321.

As illustrated in FIG. 1A and FIG. 1B, the base 10 and the lateral face of the first outer leg portion 321a of the first core 321 are bonded together in the first outer leg insertion portion 20a by the resin 40 having an adhesive function.

Here, width of the opening of the first outer leg insertion portion 20a is of a size which allows the resin 40, which is an adhesive, to be applied by being inserted from the first outer leg insertion portion 20a, even after the core 320 (the first core 321) is attached to the circuit board 20. Specifically, as illustrated in FIG. 1A and FIG. 1B, the width of the opening of the first outer leg insertion portion 20a is set so that a clearance L1a between the circuit board 20 and the lateral face of the first outer leg portion 321a in the first outer leg insertion portion 20a is larger than a clearance L2 between the circuit board 20 and the central leg portion 321c in the central leg insertion portion 20c.

Accordingly, the resin 40 can be easily applied to the bottom portion of the first core 321 via the first outer leg insertion portion 20a even after the circuit board 20, to which the first core 321 and the second core 322 are secured by the spring component 50, is placed on the base 10. For example, when the resin 40 is to be applied using a nozzle, it is preferable that the first outer leg insertion portion 20a be of a size which allows insertion of the nozzle.

It should be noted that, for the second outer leg insertion portion 20b, a clearance L1b between the circuit board 20 and the lateral face of the second outer leg portion 321b in the second outer leg insertion portion 20b is smaller than the clearance L1a between the circuit board 20 and the lateral face of the first outer leg portion 321a in the first outer leg insertion portion 20a.

Furthermore, the circuit board 20 is formed using a material such a glass epoxy such as FR-4, and is a mufti-layer substrate which includes a flat coil and is formed by sandwiching an insulating material between conductors.

Figure 3A:
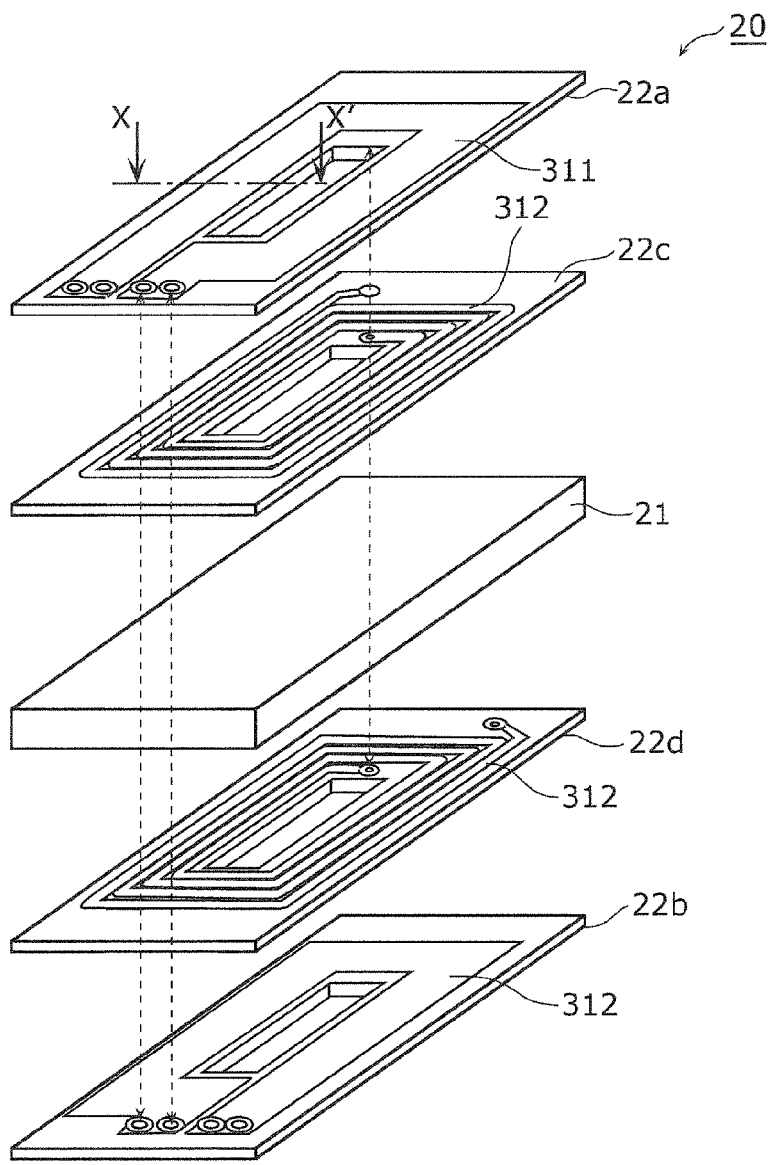
FIG. 3A is an exploded view of a circuit board in a lighting device according to Embodiment 1 of the present invention.
Figure 3B:
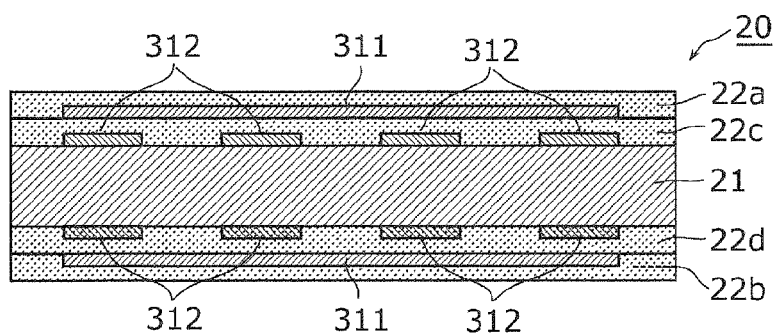
FIG. 3B is a cross-sectional view of a circuit board in a lighting device according to Embodiment 1 of the present invention at line X-X' in FIG. 3A.

Here, a detailed configuration of the circuit board 20 in this embodiment will be described using FIG. 3A and FIG. 3B. FIG. 3A is an exploded view of a circuit board in a lighting device according to Embodiment 1 of the present invention. FIG. 3B is a cross-sectional view of the circuit board at line X-X' in FIG. 3A.

As illustrated in FIG. 3A and FIG. 3B, the circuit board 20 is, for example, a coil board made from four laminated substrates, and includes a core substrate 21, the four layers of a first layer 22a to a fourth layer 22d which are formed to sandwich the core substrate 21 and are made of an insulating material, and a primary coil 311 and a secondary coil 312 which form winding patterns 310 of flat coil and are made of a conductor.

The core substrate 21 is formed, for example, by forming a heat-resistant glass substrate epoxy resin into a board-shape.

The first layer 22a and the second layer 22b make up the outermost layers of the circuit board 22, and are resists formed by curing a thermosetting epoxy resin, for example. The first layer 22a and the second layer 22b are formed to cover the third layer 22c and the fourth layer 22d, respectively. The third layer 22c and the fourth layer 22d are formed to sandwich the core substrate 21, and are prepregs of glass fiber or the like which are interwoven into a mesh for example.

The primary coil 311 and the secondary coil 312 are configured by turning, for example, copper foil a predetermined number of times. In this embodiment, the primary coil 311 and the secondary coil 312 are formed spirally to surround the periphery of the central leg insertion portion 20c of the circuit board 20. In other words, the primary coil 311 and the secondary coil 312 are formed surrounding the central leg portion 321c of the first core 321.

Furthermore, the primary coil 311 and the secondary coil 312 are formed by being divided between plural layers via a via hole in order to increase the number of turns. Specifically, the primary coil 311 is formed by being divided between the two layers of the first layer 22a and the second layer 22b, and the secondary coil 312 is formed by being divided between the two layers of the third layer 22c and the fourth layer 22d.

It should be noted that the thickness and width of the patterns of the primary coil 311 and the secondary coil 312 are determined according to the amount of current that flows at the time of transformer operation. For example, the cross-sectional area of the patterns increase when the patterns of the primary coil 311 and the secondary coil 312 are made thick, and thus the direct current resistance component decreases and the amount of current flowing through the patterns increases.

(Transformer)

As illustrated in FIG. 1A, the transformer 30 in this embodiment includes the core 320 and the winding patterns 310 formed in the circuit board 20. The drive frequency of the transformer 30 is, for example, about 10 to 500 kHz.

The winding patterns 310 is a coil portion consisting of the primary coil 311 and the secondary coil 312 which are formed in the circuit board 20 as described earlier. The primary side of the transformer 30 is formed by the primary coil 311, and the secondary side of the transformer 30 is formed by the secondary coil 312.

The core 320 forms the magnetic path of the magnetic flux created by passing current through the winding patterns 310 (the primary coil 311 and the secondary coil 312), and causes magnetic coupling of the primary coil 311 and the secondary coil 312.

As illustrated in FIG. 1B and FIG. 2, in this embodiment, the core 320 includes the first core 321 and the second core 322. As one example, the core 320 is of the EI type, and is formed by joining the substantially E-shaped first core 321 and the substantially I-shaped second core 322 together.

The first core 321 has the first outer leg portion 321a formed at one end of the main body portion, the second outer leg portion 321b formed at the other end of the main body portion, and the central leg portion 321c formed between the first outer leg portion 321a and the second outer leg portion 321b (i.e., at the center of the main body). In other words, the first core 321 has a pair of outer leg portions (the first outer leg portion 321a and the second outer leg portion 321b) and the central leg portion 321c provided between the pair of outer leg portions.

When attaching the first core 321 to the circuit board 20, the first outer leg portion 321a is inserted through the first outer leg insertion portion 20a of the circuit board 20, the second outer leg portion 321b is inserted through the second outer leg insertion portion 20b of the circuit board 20, and the central leg portion 321c is inserted through the central leg insertion portion 20c of the circuit board 20.

On the other hand, the second core 322 is a board-shaped core. When putting the first core 321 and the second core 322 together, the tips of the first outer leg portion 321a and the second outer leg portion 321b of the first core 321 abut the surface of the second core 322.

The EI type core 320 configured in the above-described manner is attached to the circuit board 20 by inserting the first outer leg portion 321a through the first outer leg insertion portion 20a of the circuit board 20, inserting the second outer leg portion 321b through the second outer leg insertion portion 20b, and inserting the central leg portion 321c through the central leg insertion portion 20c, so that the circuit board 20 is sandwiched by the first core 321 and the second core 322.

The first core 321 and the second core 322 are, for example, ferrite cores, and can be formed by mixing manganese oxide, zinc oxide, nickel oxide, or the like, into iron oxide, and sintering at a high temperature of 1000° C. to 1400° C.

(Resin)

The resin 40 is an adhesive for bonding the core 320 of the transformer 30 and the base 10. An insulating adhesive comprising a silicone resin, or the like, can be used for the resin 40.

Figure 4:
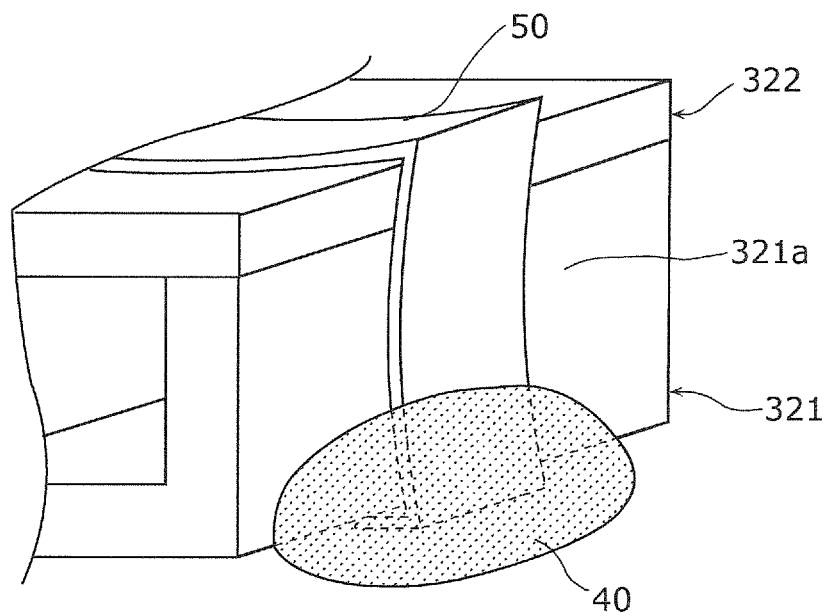
FIG. 4 is a perspective view of a configuration of a vicinity of a resin in a lighting device according to Embodiment 1 of the present invention.

Here, the detailed configuration of the resin 40 will be described using FIG. 4 with reference to FIG. 1A and FIG. 1B. FIG. 4 is a perspective view of a configuration of the vicinity of a resin in a lighting device according to Embodiment 1 of the present invention.

As illustrated in FIG. 1A, FIG. 1B, and FIG. 4, the resin 40 bonds together the first core 321 of the core 320 and the base 10. Specifically, the resin 40 can be inserted from the first outer leg insertion portion 20a, and is provided between the lateral face of the first outer leg portion 321a of the first core 321 and the surface of the base 10 by being brought into contact with the lateral face of the first outer leg portion 321a and the surface of the base 10 in the first outer leg insertion portion 20a.

Furthermore, the resin 40 is formed on the surface of the core 320 (the first core 321) from the first outer leg portion 321a to a point up to the second outer leg portion 321b. More specifically, the resin 40 is formed on the surface of the core 320 (the first core 321) from the first outer leg portion 321a to a point up to the central leg portion 321c. In this manner, adhesive (the resin 40) is not applied throughout the circuit board 20, and the resin 40 is formed only on the portions around the first outer leg portion 321a. In other words, the resin 40 is not formed in a gap between the circuit board 20 and the base 10, and the gap forms air space.

In addition, the resin 40 in this embodiment, as illustrated in FIG. 1B, is also disposed between the bottom face of the first core 321 (the first outer leg portion 321a) and the top face of the base 10. In other words, the resin 40 in this embodiment is provided continuously from the lateral face to the bottom face of the first core 321.

When bonding together the core 320 and the base 10, the resin 40 may be applied in advance to a predetermined position in the base 10 before the circuit board 20, to which the first core 321 and the second core 322 are secured by the spring component 50, is placed on the base 10. However, since the opening of the first outer leg insertion portion 20a of the circuit board 20 is of a size which allows the resin 40 to be applied via the first outer leg insertion portion 20a even after the core 320 is attached to the circuit board 20 as described above, the resin 40 can be applied toward the bottom portion of the first core 321 via the first outer leg insertion portion 20a, even after the circuit board 20, to which the first core 321 and the second core 322 are secured by the spring component 50, is placed on the base 10.

It should be noted that, after the resin 40 is applied, the core 320 (first core 321) and the base 10 can be bonded together by curing the resin 40.

Furthermore, the resin 40 is provided between the spring component 50 and the base 10. Specifically, the resin 40 is provided so as to cover a bottom portion of the lateral face of the first core 321 so as to cover the bottom portion of a first arm portion 52a of the spring component 50. With this, the spring component 50 and the base 10 can also be bonded together by the resin 40.

(Spring Component)

As illustrated in FIG. 1A and FIG. 1B, the spring component 50 is a fixing spring (core fixing equipment) for securing the first core 321 and the second core 322 in an integrated manner through spring elastic force. By being clamped together by the spring component 50, the first core 321 and the second core 322 are attached to the circuit board 20 in such a way that the circuit board 20 is sandwiched by the first core 321 and the second core 322.

As illustrated in FIG. 1B and FIG. 2, the spring component 50 is a clip-type plate spring, and has a plate-like body portion 51, a pair of plate-like arm portions (the first arm portion 52a and a second arm portion 52b), and a pair of plate-like holding portions (a first holding portion 53a and a second holding portion 53b).

The body portion 51 comes into contact with the top surface of the second core 322, when securing the first core 321 and the second core 322. By clamping the first core 321 and the second core 322 together using the body portion 51 and the first holding portion 53a and second holding portion 53b, the first core 321 and the second core 322 are held in an integrated manner by the spring component 50.

Each of the pair of the first arm portion 52a and the second arm portion 52b are connected approximately perpendicularly to different lengthwise ends of the body 51, and extend toward the base 10 so as to be respectively inserted through the first outer leg insertion portion 20a and the second outer leg insertion portion 20b of the circuit board 20.

Furthermore, in this embodiment, when securing the first core 321 and the second core 322 together using the spring component 50, the inner face of the first arm portion 52a comes into contact with the lateral face of the first leg portion 321a, and the inner face of the second arm portion 52b comes into contact with the lateral face of the second leg portion 321b.

The first holding portion 53a and the second holding portion 53b are formed by bending the end of the first arm portion 52a and the end of the second arm portion 52b toward each other. The first holding portion 53a and the second holding portion 53b come into contact with the bottom face of the first core 321, when securing the first core 321 and the second core 322 together using the spring component 50.

Although a metal such as SUS is used for the material of the spring component 50, the material of the spring component 50 is not limited to metal. Furthermore, the spring component 50 can be formed, for example, by shaping a single metal plate.

(Summary)

As described above, in the lighting device 1 in this embodiment, the base 10 and the lateral face of the first outer leg portion 321a of the first core 321 are bonded together in the first outer leg insertion portion 20a by the resin 40 which can be inserted from the first outer leg insertion portion 20a. Furthermore, the resin 40 is formed only on the surface of the first core 321 from the first outer leg portion 321a to a point up to the second outer leg portion 321b. In other words, the lateral face of the first outer leg portion 321a and the base 10 are bonded together by having the resin 40 inserted from the first outer leg insertion portion 20a.

Accordingly, even after the circuit board 20, to which the core 320 is attached, is placed on the base 10, the core 320 and the base 10 can be easily bonded together because the resin 40 can be inserted and applied from the first outer leg insertion portion 20a. Because, for example, a nozzle for applying the resin 40 can be inserted through the first leg insertion portion 20a and the resin 40 can be applied continuously from the first outer leg insertion portion 20a to the base 10, the lighting device 1 can be easily assembled. Furthermore, since bonding is possible after the circuit board 20 is placed on the base 10, positioning of the circuit board 20 and the base 10 can be performed precisely before bonding together the circuit board 20 and the base 10.

In addition, in this embodiment, the first core 321 and the second core 322 can be attached to the circuit board 20 by inserting the three leg portions of the first core 321 through the corresponding three through holes (the first outer leg insertion portion 20a, the second outer leg insertion portion 20b, and the central leg insertion portion 20c) of the circuit board 20, and clamping together the first core 321 and the second core 322 using the spring component 50, in a state where the circuit board 20 is sandwiched between the first core 321 and the second core 322.

In this case, when the circuit board 20 is shaken, or when the three leg portions of the first core 321 are inserted through the through holes at the time of manufacturing, there are cases where the legs of the first core 321 and the edges of the through holes of the circuit board 20 come into contact with each other creating chips or cracks in the first core 321, and thereby causing deterioration of the characteristics of the transformer 30.

In contrast, in this embodiment, the width of the opening of at least the first outer leg insertion portion 20a is of a size which allows application of the resin 40. With this, it is possible to suppress contact between the first outer leg portion 321a of the first core 321 and the edge of the first outer leg insertion portion 20a. Therefore, deterioration of the characteristics of the transformer 30 due to chips or cracks in the first core 321 can be suppressed. Furthermore, since the width of the opening of the first outer leg insertion portion 20a is large, the insertability of the first core 321 (the first outer leg portion 321a) through the first outer leg insertion portion 20a can be improved.

Furthermore, in this embodiment, as illustrated in FIG. 1A and FIG. 1B, the clearance L1a between the circuit board 20 and the lateral face of the first outer leg portion 321a in the first outer leg insertion portion 20a is larger than the clearance L2 between the circuit board 20 and the central leg portion 321c in the central leg insertion portion 20c.

Accordingly, even after the circuit board, to which the core 320 is attached, is placed on the base 10, the resin 40 can be easily applied to a predetermined position via the first outer leg insertion portion 20a.

Furthermore, in this embodiment, the first core 321 and the second core 322 are secured together by the spring component 50 and attached to the circuit board 20. As such, in the first outer leg insertion portion 20a, it is preferable that the clearance between the circuit board 20 and outer face of the first holding unit 52a of the spring component 50 which is inserted through the first outer leg insertion portion 20a be made larger than the clearance between the first outer leg portion 321a and the inner face of the first arm portion 52a.

Accordingly, an opening portion for the first outer leg insertion portion 20a can be ensured even when the first core 321 and the second core 322 are secured together by the spring component 50, and thus the resin 40 can be easily applied via the first outer leg insertion portion 20a.

In addition, in this case, as illustrated in FIG. 1B, it is preferable that the first arm portion 52a of the spring component 50 be in contact with the first outer leg portion 321a of the first core 321. In other words, it is preferable that the clearance between the first outer leg portion 321a and the inner face of the first arm portion 52a be zero.

Accordingly, even if the first arm portion 52a of the spring component 50 is inserted through the first outer leg insertion portion 20a, it is possible to ensure a maximum size for the width of the opening of the first outer leg insertion portion 20a. Therefore, the resin 40 can be more easily applied via the first outer leg insertion portion 20a.

Furthermore, in this embodiment, as illustrated in FIG. 1B, aside from the lateral face of the first core 321 (the first outer leg portion 321a), the resin 40 is also disposed between the bottom face of the first core 321 and the top face of the base 10.

Accordingly, the base 10 and the lateral and bottom faces of the of the first core 321 can be bonded together, and thus the core 320 (the first core 321) and the base 10 can be bonded together strongly.

As described thus far, according to the lighting device 1 according to this embodiment, easy assembly is possible, changing of transformer electrical characteristics caused by chips or cracks in the core in a high-temperature environment or a shaky environment is suppressed thereby enabling increased transformer efficiency, and a small lighting device capable of suppressing circuit breakage due to heat stress can be realized.

(Modification 1)

Figure 5A:
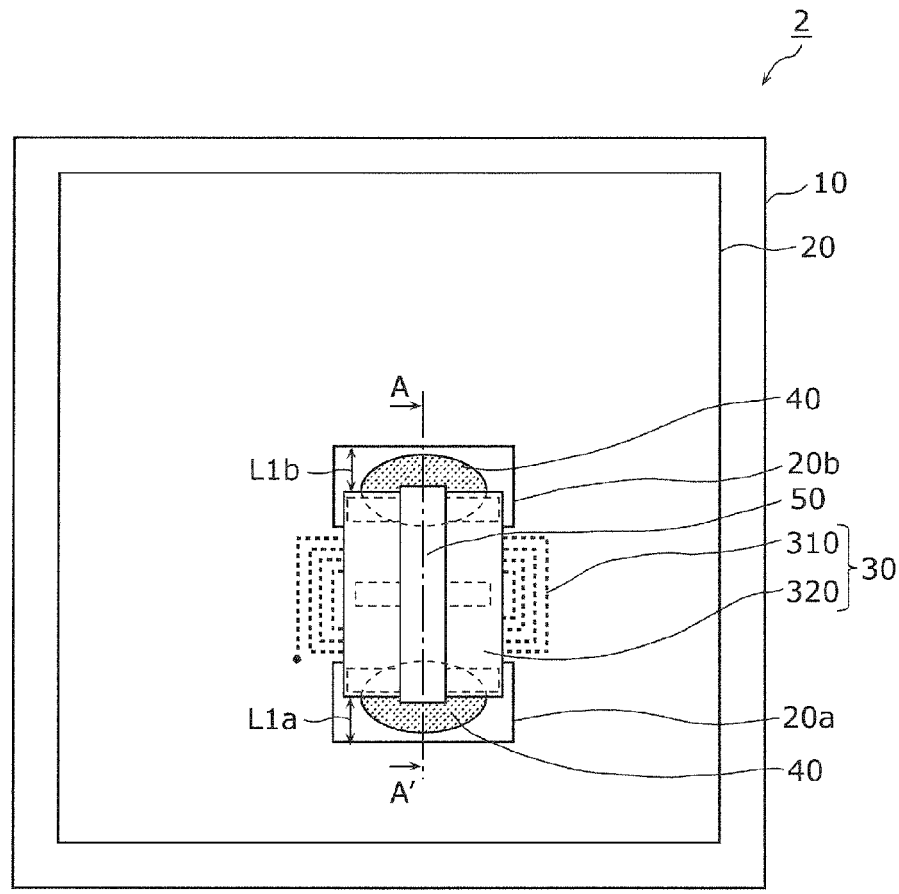
FIG. 5A is a plan view of a lighting device according to Modification 1 of Embodiment 1 of the present invention.
Figure 5B:
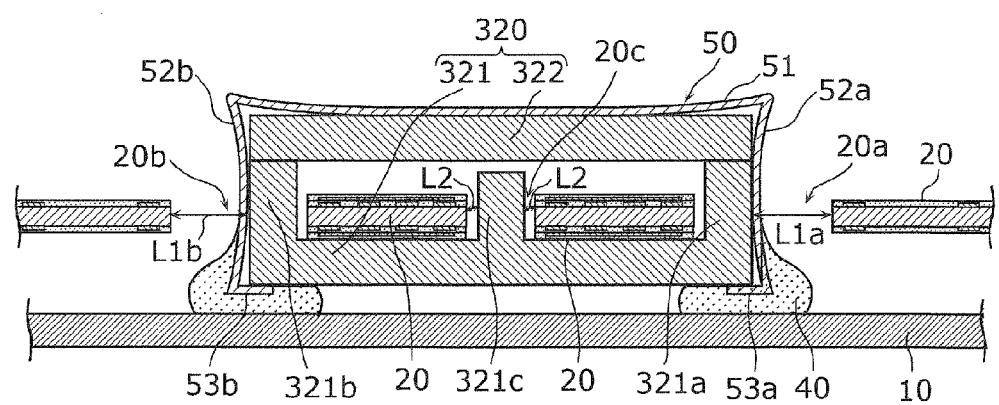
FIG. 5B is a cross-sectional view of a lighting device according to Modification 1 of Embodiment 1 of the present invention at line A-A' in FIG. 5A.

Next, a lighting device 2 according to Modification 1 of Embodiment 1 of the present invention will be described using FIG. 5A and FIG. 5B. FIG. 5A is a plan view of a lighting device according to Modification 1 of Embodiment 1 of the present invention. FIG. 5B is a cross-sectional view of the lighting device at line A-A' in FIG. 5A.

In the lighting device 1 in the forgoing embodiment illustrated in FIG. 1A, the first core 321 and the base 10 are not in contact at the second outer leg insertion portion 20b, and the clearance L1b between the circuit board 20 and the lateral face of the second outer leg portion 321b in the second outer leg insertion portion 20b is smaller than the clearance L1a between the circuit board 20 and the lateral face of the first outer leg portion 321a in the first outer leg insertion portion 20a.

On the other hand, in the lighting device 2 in this modification, as illustrated in FIG. 5A and FIG. 5B, aside from the lateral face of the first outer leg portion 321a and the base 10 being bonded together by a first resin 41 in the first outer leg insertion portion 20a, the lateral face of the second outer leg portion 321b and the base 10 are also bonded together by a second resin 42 in the second outer leg insertion portion 20b. In other words, in this modification, each of the pair of outer leg portions (the first outer leg portion 321a and the second outer leg portion 321b) of the first core 321 and the base 10 are bonded together using two resins (the first resin 41 and the second resin 42).

Specifically, the first resin 41 is the same as the resin 40 in the forgoing embodiment, and is formed on the surface of the core 320 (the first core 321) from the first outer leg portion 321a to a point up to the central leg portion 321c.

Furthermore, the second resin 42 is formed on the surface of the core 320 (the first core 321) from the second outer leg portion 321b to a point up to the first outer leg portion 321a. In this modification, the second resin 42 is formed on the surface of the core 320 (the first core 321) from the second outer leg portion 321b to a point up to the central leg portion 321c.

In this manner, resin (adhesive) is not applied throughout the circuit board 20, but formed only on the portions around the two locations of the first outer leg portion 321a and the second outer leg portion 321b.

Furthermore, in this modification, since the first resin 41 and the second resin 42 are inserted from the first outer leg insertion portion 20a and the second outer leg insertion portion 20b, respectively, aside from the first outer leg insertion portion 20a, the width of the opening of the second outer leg insertion portion 20b is also made large.

Specifically, the clearance L1b between the circuit board 20 and lateral face of the second outer leg portion 321b in the second outer leg insertion portion 20b is made identical as the clearance L1a between the circuit board 20 and the lateral face of the first outer leg portion 321a in the first outer leg insertion portion 20a, and the width of the opening of the second outer leg insertion portion 20b is made large.

In other words, in the same manner as the opening of the first outer leg insertion portion 20a, the width of the opening of the second outer leg insertion portion 20b is of a size which allows application of the second resin 42 via the second outer leg insertion portion 20b even after the circuit board 20, to which the core 320 (the first core 321) is attached, is placed on the base 10, and the clearance L1b is made larger than the clearance L2 (i.e., the clearance between the circuit board 20 and the central leg portion 321c in the central leg insertion portion 20c).

Thus, according to the lighting device 2 in this modification, the lateral face of the first outer leg portion 321a and the base 10 are bonded together in the first outer leg insertion portion 20a by the first resin 41 which can be inserted from the first outer leg insertion portion 20a, and the lateral face of the second outer leg portion 321b and the base 10 are bonded together in the second outer leg insertion portion 20b by the second resin 42 which can be inserted from the second outer leg insertion portion 20b. Furthermore, the first resin 41 is formed only on the surface of the first core 321, from the first outer leg portion 321a to a point up to the second outer leg portion 321b, and the second resin 42 is formed only on the surface of the first core 321, from the second outer leg portion 321b to a point up to the first outer leg portion 321a. In other words, in this modification, the base 10 and the two lateral faces of the first core 321 (the later face of the first outer leg portion 321a and the lateral face of the second outer leg portion 321b) are bonded together by inserting the two of the first resin 41 and the second resin 42 from the first outer leg insertion portion 20a and the second outer leg insertion portion 20b, respectively.

Accordingly, the core 320 and the base 10 can be easily bonded together even after the circuit board 20, to which the core 320 is attached, is placed on the base 10, as in Embodiment 1, because the first resin 41 and the second resin 42 can be inserted and applied from the first outer leg insertion portion 20a and the second outer leg insertion portion 20b, respectively. On top of that, since they are fixed at two places, the core 320 (first core 321) and the base 10 can be more strongly bonded together compared to Embodiment 1.

Furthermore, in this modification too, as illustrated in FIG. 5B the first resin 41 in the first outer leg insertion portion 20a is disposed, not only on the lateral face of the first core 321 (the first outer leg portion 321a), but also between the bottom face of the first core 321 and the top face of the base 10. Furthermore, in this modification, the second resin 42 in the second outer leg insertion portion 20b is also disposed, not only on the lateral face of the first core 321 (the second outer leg portion 321b), but also between the bottom face of the first core 321 and the top face of the base 10.

Accordingly, since the lateral face and bottom face of the first core 321 and the base 10 are bonded together at two places on the first core 321, the core 320 (the first core 321) and the base 10 can be bonded together more strongly.

Furthermore, as in this modification, by making the width of the openings of the first outer leg insertion portion 20a and the second outer leg insertion portion 20b large, it is possible to suppress contact between the first outer leg portion 321a and the edge of the first outer leg insertion portion 20a and between the second outer leg portion 321b and the edge of the second outer leg insertion portion 20b. Therefore, compared to the forgoing embodiment, deterioration of the characteristics of the transformer 30 due to chips or cracks in the first core 321 can be further suppressed. In addition, the insertability of the leg portions (the first outer leg portion 321a and the second outer leg portion 321b) of the first core 321 through the outer leg insertion portions (the first outer leg insertion portion 20a and the second outer leg insertion portion 20b) of the circuit board 20 can be further improved.

(Modification 2)

Figure 6:
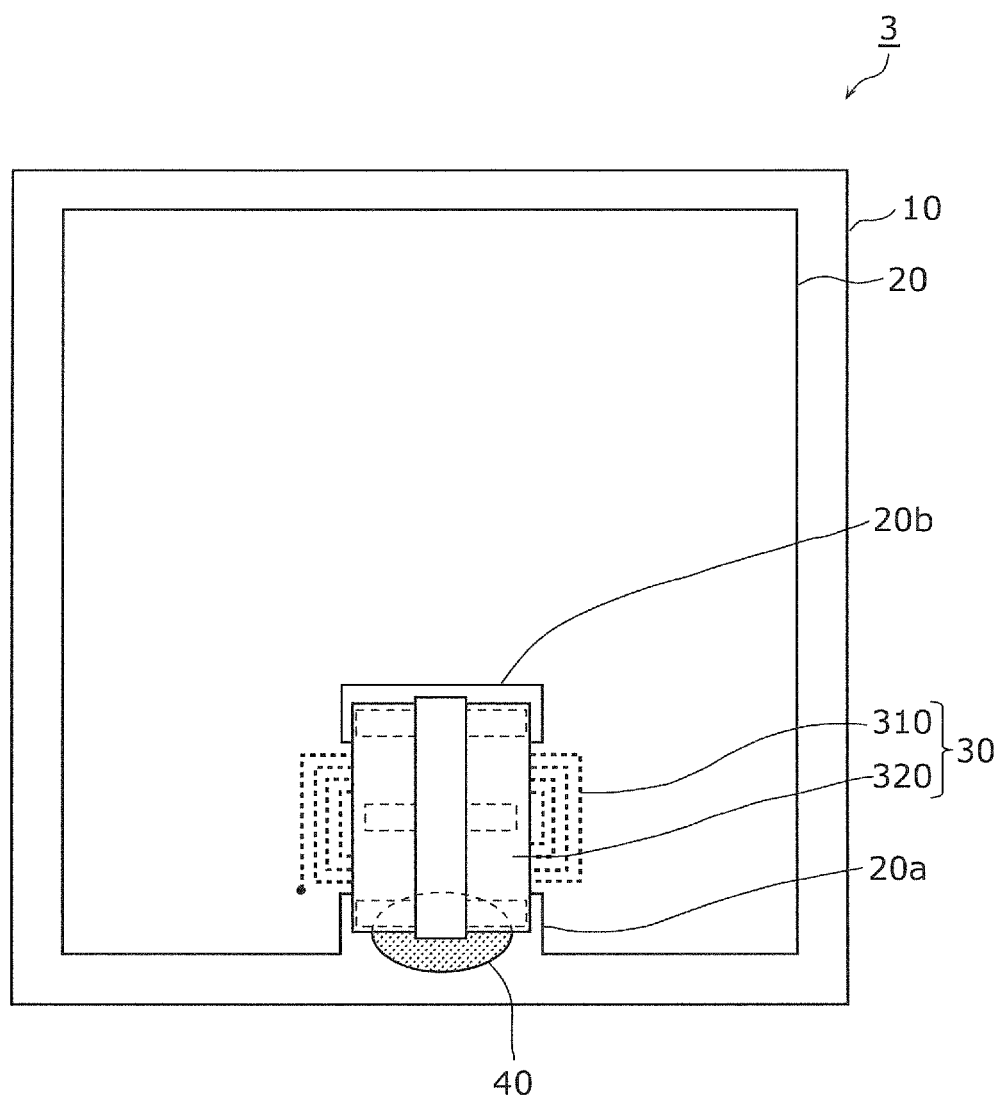
FIG. 6 is plan view of a lighting device according to Modification 2 of Embodiment 1 of the present invention.

Next, a lighting device 3 according to Modification 2 of Embodiment 1 of the present invention will be described using FIG. 6. FIG. 6 is a plan view of a lighting device according to Modification 2 of Embodiment 1 of the present invention.

Whereas the first outer leg insertion portion 20a is a through hole penetrating through the circuit board 20 in the lighting device 1 in the forgoing embodiment illustrated in FIG. 1A, in the lighting device 3 in this modification, the first outer leg insertion portion 20a is a notch formed by cutting out a portion of the outer edge of the circuit board 20, as illustrated in FIG. 6.

Specifically, the first outer leg insertion portion 20a is a notch formed by cutting out, in a rectangular shape, a central portion of one side of the circuit board 20 having a rectangular plan view shape. It should be noted that the shape of the notch is not limited to a rectangle.

As described above, according to the lighting device 3 in this modification, the base 10 and the lateral face of the first outer leg portion 321a of the first core 321 are bonded together in the first outer leg insertion portion 20a by the resin 40 which can be inserted from the first outer leg insertion portion 20a, in the same manner as in the lighting device 1 in the forgoing embodiment. Furthermore, the resin 40 is formed only on the surface of the first core 321, from the first outer leg portion 321a to a point up to the second outer leg portion 321b. In other words, the lateral face of the first outer leg portion 321a and the base 10 are bonded together by having the resin 40 inserted from the first outer leg insertion portion 20a.

Accordingly, even after the circuit board 20, to which the core 320 is attached, is placed on the base 10, the core 320 and the base 10 can be easily bonded together because the resin 40 can be inserted and applied using the first outer leg insertion portion 20a.

In addition, in this modification, the first outer leg insertion portion 20a is a notch formed by making a cut-out in one side of the circuit board 20.

Accordingly, since the top portion of the lateral face of the first outer leg portion 321a is open even after the first outer leg portion 321a of the first core 321 is inserted through the first outer leg insertion portion 20a, it becomes easy to insert a nozzle for applying the resin 40 through the first outer leg insertion portion 20a. For example, the nozzle can be inserted from the side instead of from above the first outer leg insertion portion 20a. Therefore, the resin 40 can be more easily applied compared to when the first outer leg insertion portion 20a is a through hole.

Furthermore, by making the first outer leg insertion portion 20a a notch, contact between the first outer leg portion 321a of the first core 321 and the edge of the first outer leg insertion portion 20a can be further suppressed compared to Embodiment 1. Therefore, deterioration of the characteristics of the transformer 30 due to chips or cracks in the first core 321 can be further suppressed. In addition, the insertability of the first core 321 (the first outer leg portion 321a) through the first outer leg insertion portion 20a can be further improved.

Furthermore, by making the first outer leg insertion portion 20a a notch, it is possible to increase the mounting area for electronic components in the circuit board 20 compared to when the first outer leg insertion portion 20a is a through hole.

Figure 7:
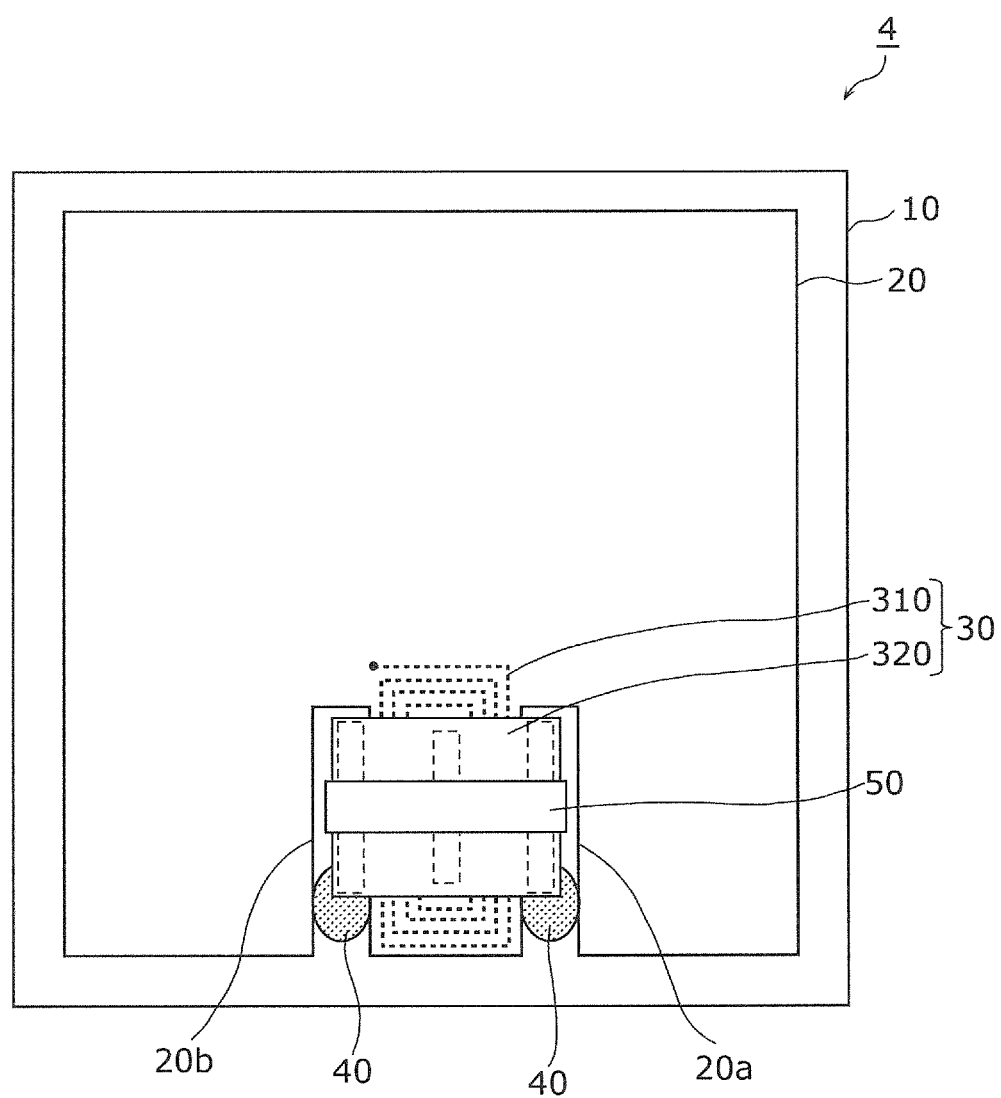
FIG. 7 is a plan view of a lighting device according to Modification 2 of Embodiment 1 of the present invention.

It should be noted that although the second outer leg insertion portion 20b is a through hole, the first outer leg insertion portion 20a is a notch, and the first core 321 and the base 10 are bonded together by the resin 40 only in the first outer leg insertion portion 20a in the lighting device 3 illustrated in FIG. 6, both the first outer leg insertion portion 20a and the second outer leg insertion portion 20b may be notches, and the first core 321 and the base 10 may be bonded together by the first resin 41 and the second resin 42 in the two locations of the first outer leg insertion portion 20a and the second outer leg insertion portion 20b, respectively, as in a lighting device 4 illustrated in FIG. 7.

With this, the core 320 (the first core 321) and the base 10 can be bonded together more strongly compared to the lighting device 3 illustrated in FIG. 6.

Furthermore, in the case of the configuration illustrated in FIG. 7, the first resin 41 and the second resin 42 can be applied by inserting a nozzle from the open area of the notches of the first outer leg insertion portion 20a and the second outer leg insertion portion 20b. In other words, the nozzle can be inserted by being slid from the side of the notch instead of from above the first outer leg insertion portion 20a.

Accordingly, even if the width of the respective notches of the first outer leg insertion portion 20a and the second outer leg insertion portion 20b is smaller than the width of the opening of the first outer leg insertion portion 20a illustrated in FIG. 1A, the first resin 41 and the second resin 42 can still be applied via the first outer leg insertion portion 20a and the second outer leg insertion portion 20b. As a result, the mounting area for electronic components in the circuit board 20 can be increased compared to the lighting device 3 illustrated in FIG. 6.

(Modification 3)

Figure 8:
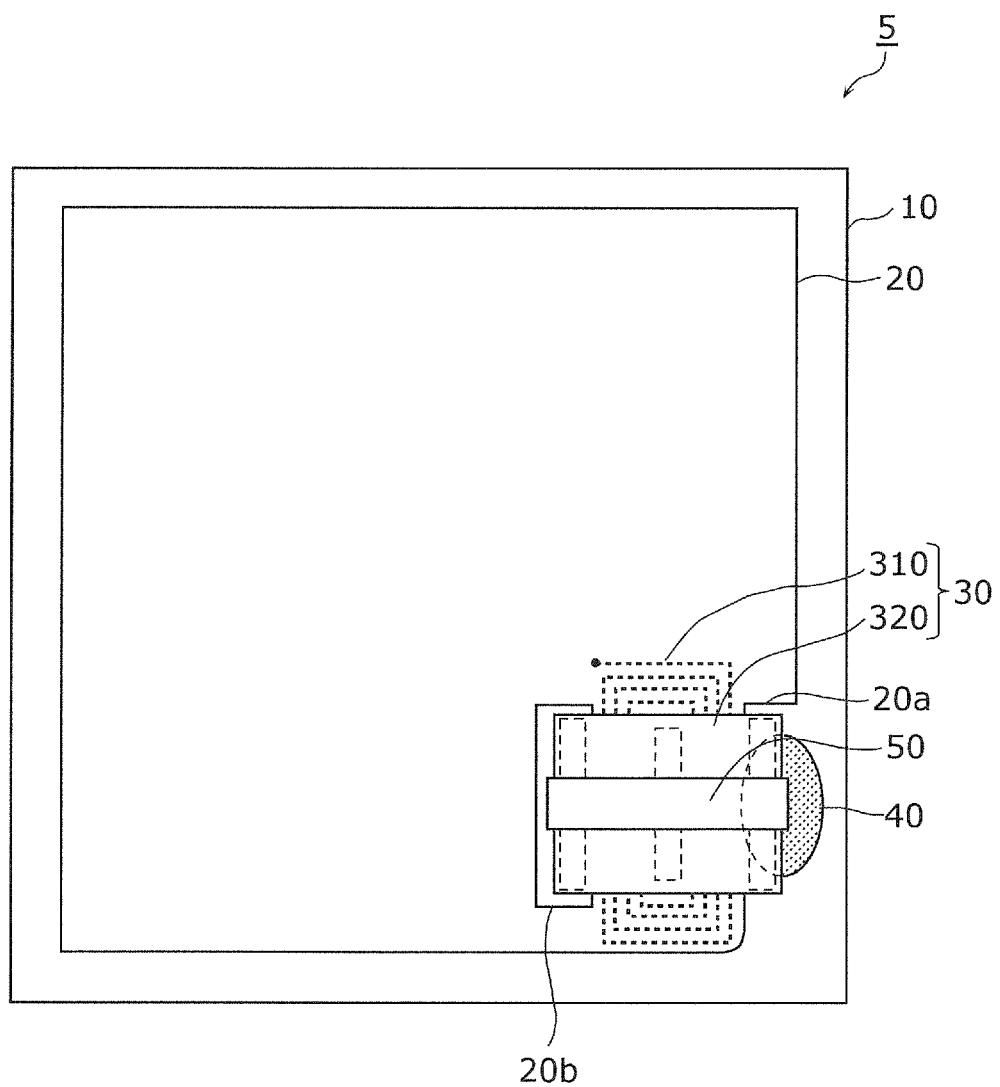
FIG. 8 is a plan view of a lighting device according to Modification 3 of Embodiment 1 of the present invention.

Next, a lighting device 5 according to Modification 3 of Embodiment 1 of the present invention will be described using FIG. 8. FIG. 8 is a plan view of a lighting device according to Modification 3 of Embodiment 1 of the present invention.

In the lighting device 5 in this embodiment, first outer leg insertion portion 20a is a notch formed by cutting out a portion of the outer edge of the circuit board 20 in the same manner as in the lighting device 3 in Modification 2. However, whereas the central portion of one side of the circuit board 20 is cut out in the lighting device 3 in Modification 2, a corner portion of the circuit board 20 is cut out in the lighting device 5 in this modification, as illustrated in FIG. 8.

Specifically, the first outer leg insertion portion 20a in this modification is a notch formed by cutting out one of the corner portions of the circuit board 20 having a rectangular plan view shape, and has a shape obtained by making a cut out from one point of one side of the circuit board 20 up to the corner portion. In other words, the plan view shape of the circuit board 20 before forming the first outer leg insertion portion 20a (notch) is rectangular.

It should be noted that, although the first outer leg insertion portion 20a is cut out in a rectangular shape in this modification, the shape of the cut-out is not limited to a rectangle.

Thus, the lighting device 5 in this modification can obtain the same advantageous effects as the lighting device 3 in Modification 2. In other words, while increasing the mounting area for electronic components in the circuit board 20, it is possible to easily apply the resin 40 using the first outer leg insertion portion 20a even after the circuit board 20, to which the core 320 is attached, is placed on the base 10. Furthermore, deterioration of the characteristics of the transformer 30 due to chips or cracks in the first core 321 can be suppressed, and insertability of the first core 321 (the first outer leg portion 321a) through the first outer leg insertion portion 20a can be improved.

Figure 9:
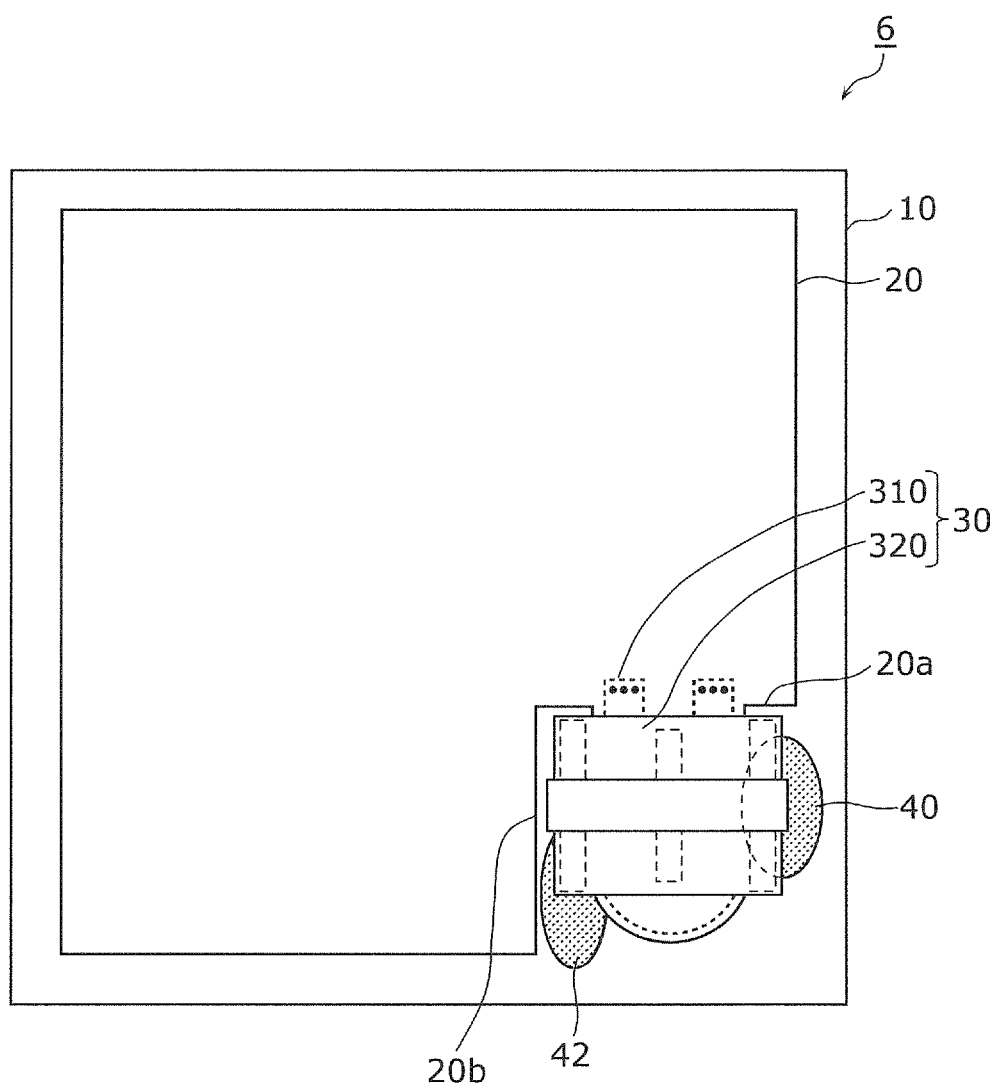
FIG. 9 is plan view of a lighting device according to Modification 3 of Embodiment 1 of the present invention.

It should be noted that although the second outer leg insertion portion 20b is a through hole, the first outer leg insertion portion 20a is a notch, and the first core 321 and the base 10 are bonded together by the resin 40 only in the first outer leg insertion portion 20a in the lighting device 5 illustrated in FIG. 8, both the first outer leg insertion portion 20a and the second outer leg insertion portion 20b may be notches, and the first core 321 and the base 10 may be bonded together by the first resin 41 and the second resin 42 in the two locations of the first outer leg insertion portion 20a and the second outer leg insertion portion 20b, respectively, as in a lighting device 6 illustrated in FIG. 9.

With this, the core 320 (the first core 321) and the base 10 can be bonded together more strongly compared to the lighting device 5 illustrated in FIG. 8.

Furthermore, in the case of the configuration illustrated in FIG. 9, the first outer leg insertion portion 20a cuts out the corner portion of the circuit board 20, thus allowing the unusable area in the circuit board 20 to be reduced. Furthermore, since the second outer leg insertion portion 20b cuts out a portion of one side of the circuit board 20, the second resin 42 can be applied via the second outer leg insertion portion 20b even if the width of the cut-out of the second outer leg insertion portion 20b is smaller than the width of the opening of the first outer leg insertion portion 20a illustrated in FIG. 1A. As a result, the mounting area for electronic components in the circuit board 20 can be increased compared to the lighting device 5 illustrated in FIG. 8.

Embodiment 2

Figure 10:
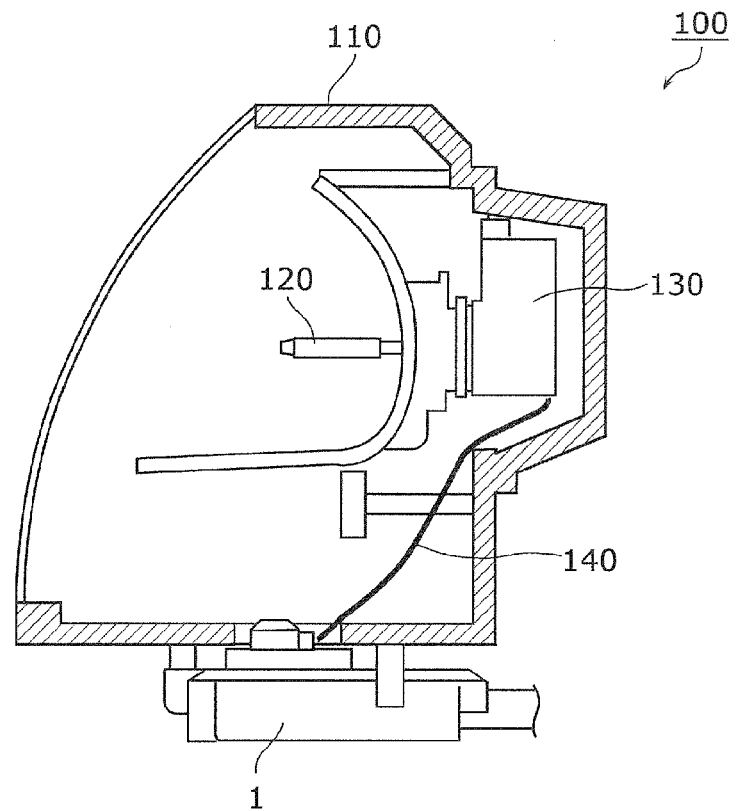
FIG. 10 is a cross-sectional view of a light fixture according to Embodiment 2 of the present invention.
Figure 11:
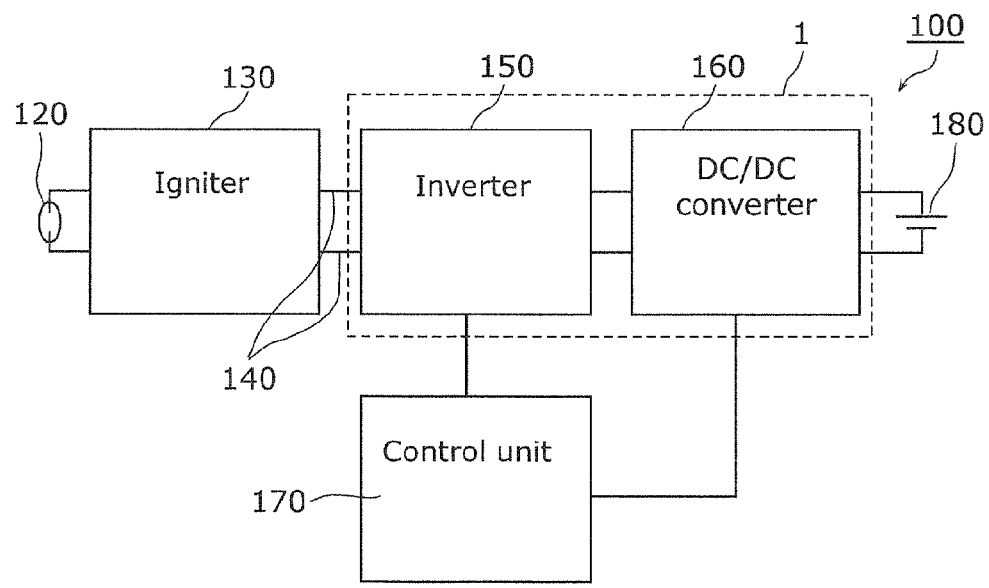
FIG. 11 is a block diagram illustrating a configuration of a light fixture according to Embodiment 2 of the present invention.

Next, a light fixture 100 according to Embodiment 2 of the present invention will be described using FIG. 10 and FIG. 11. FIG. 10 is a cross-sectional view of a light fixture according to Embodiment 2 of the present invention. FIG. 11 is a block diagram illustrating a configuration of a light fixture according to Embodiment 2 of the present invention.

The light fixture 100 according to this embodiment is a headlight in a vehicle such as an automobile, and so on, and, as illustrated in FIG. 10, includes a housing 110, an HID lamp 120 which is a light source housed inside the housing 110, an igniter 130 with integrated socket for attaching the HID lamp 120, and the lighting device 1 for controlling the lighting of the HID lamp 120.

The lighting device 1 is attached to the bottom of the housing 110, and is connected with the igniter 130 by a harness 140. The lighting device 1 supplies predetermined power to the HID lamp 120 via the igniter 130. It should be noted that, although the lighting device 1 according to Embodiment 1 illustrated in FIG. 1A and FIG. 1B is used here, the lighting devices 2 to 6 in the modifications may be used as the lighting device.

As illustrated in FIG. 11, in the light fixture 100, the lighting device 1 includes, as a power supply circuit unit, an inverter 150 and a DC/DC converter 160, and is connected to a power supply 180 (for example, a direct current power supply such as a battery). The direct current power supplied from the power supply 180 undergoes power conversion by the DC/DC converter 160 and the inverter 150, and the output of the inverter 150 is supplied to the igniter 130 via the harness 140.

The igniter 130 generates a high voltage of several tens of kV for starting up the HID lamp 120, and causes the HID lamp 120 to start up by applying the high voltage to the HID lamp 120.

The inverter 150 is, for example, a full-bridge inverter which converts the direct current output voltage of the DC/DC converter 160 to a low-frequency square wave. Prior to the start up of the HID lamp 120, the inverter 150 supplies the igniter 130 with a voltage which causes the generation of a starting pulse.

The DC/DC converter 160 is, for example, a flyback DC/DC converter which raises or lowers the direct current voltage from the power supply 180 to the voltage required by the HID lamp, by changing the ON time, drive frequency, or the like, of a switching element. The DC/DC converter 160 includes the transformer 30 in Embodiment 1.

The control unit 170 controls the DC/DC converter 160 so that the output power of the lighting device 1 is at the target power.

As described above, the lighting device 1 to 6 in the foregoing embodiments can be used in a light fixture, or the like, of a vehicle, or the like.

Embodiment 3

Figure 12:
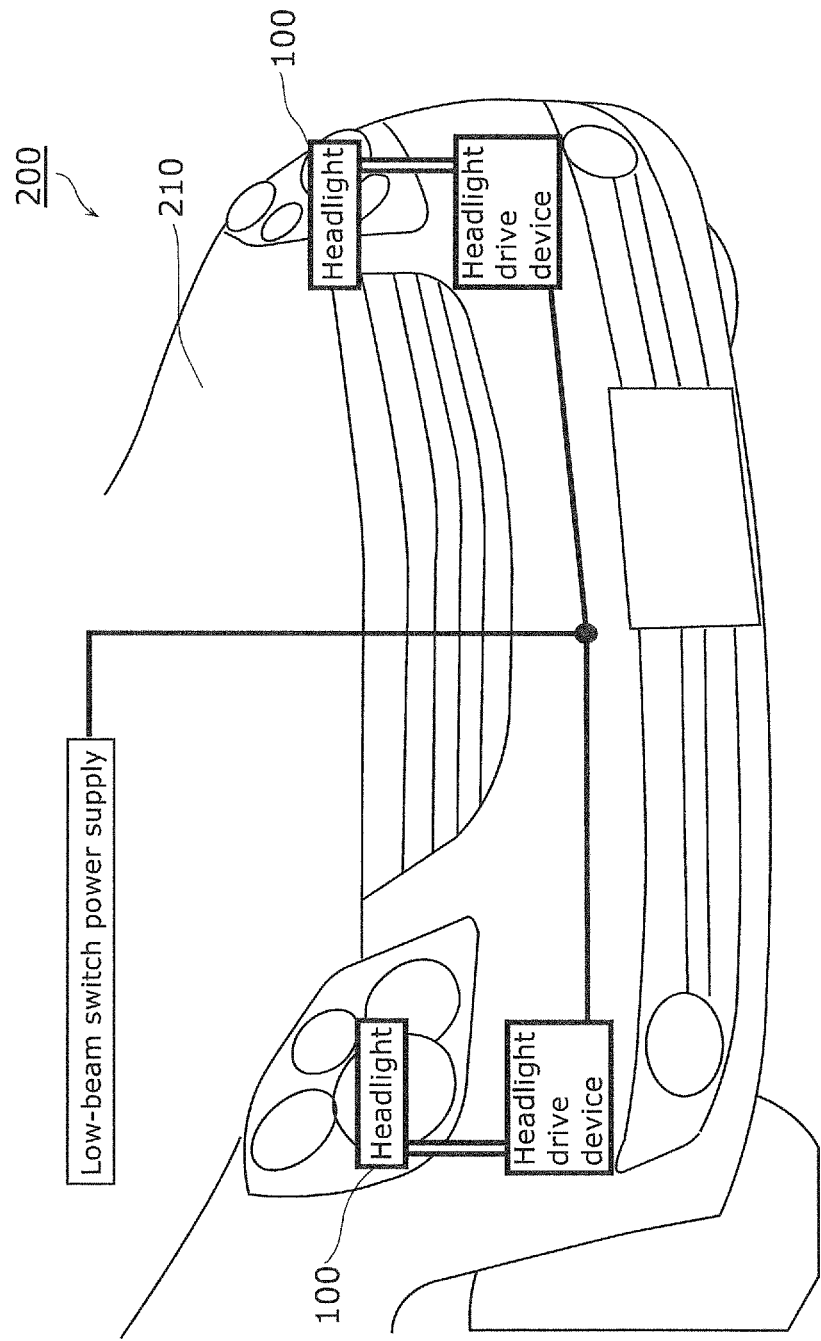
FIG. 12 is a diagram showing an outline configuration of a vehicle according to Embodiment 3 of the present invention.

Next, a vehicle 200 according to Embodiment 3 of the present invention will be described using FIG. 12. FIG. 12 is a diagram showing an outline configuration of a vehicle according to Embodiment 3 of the present invention.

As shown in FIG. 12, the vehicle 200 according to this embodiment is, for example, a four-wheeled automobile, and includes a vehicle body 210 and headlights which are light fixtures 100 attached to the vehicle body 210.

In recent years, engine room space is being reduced to secure more passenger room inside the automobile or for weight-reduction aimed at improving fuel consumption Consequently, aside from the increase in temperature inside the engine room, the lighting device which controls the lighting of a light source is placed nearer the engine which releases a large amount of heat, and thus there is a demand for a smaller lighting device that is more capable of stably lighting a light source even in a high-temperature environment.

The lighting devices 1 to 6 in the foregoing embodiments allow for easy assembly, are small, and exhibit minimal change in electrical characteristics even in a high-temperature environment, and are thus useful in a light fixture of a vehicle such as an automobile.

(Other Modifications, and So on)

Although lighting devices, light fixtures, and vehicles according to aspects of the present invention have been described based on embodiments and modifications, the present invention is not limited to the above-described embodiments and modifications.

Figure 13A:
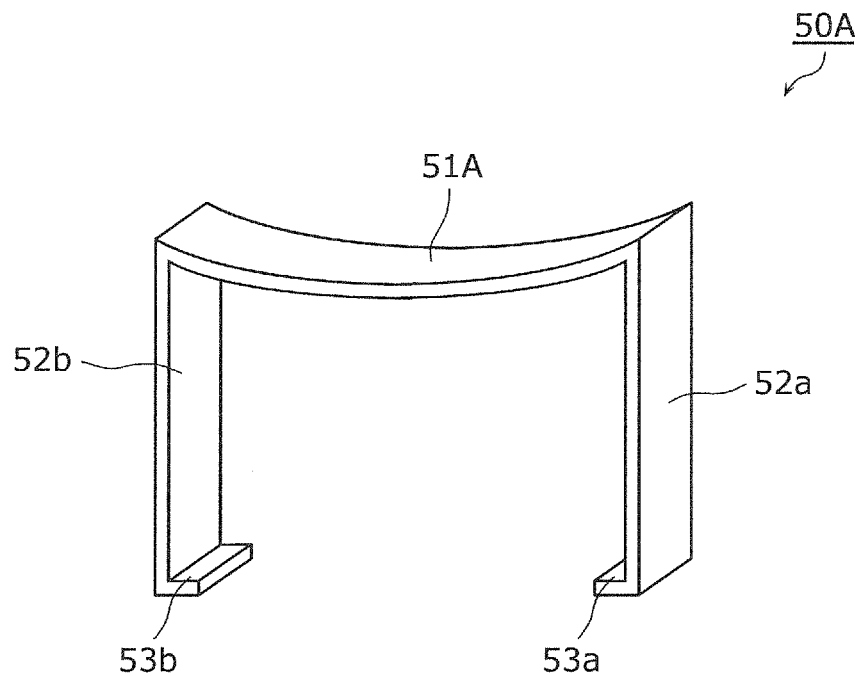
FIG. 13A is diagram illustrating another configuration of a spring component in a lighting device according to Embodiment 1 of the present invention.
Figure 13B:
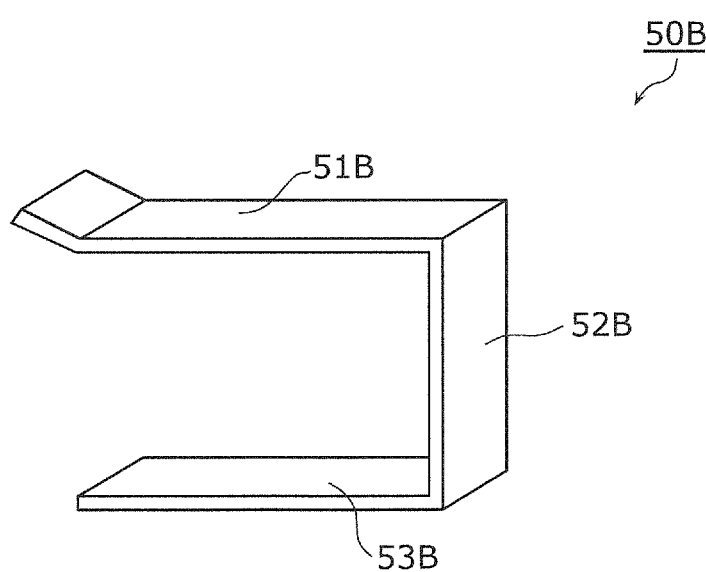
FIG. 13B is diagram illustrating yet another configuration of a spring component in a lighting device according to Embodiment 1 of the present invention.

For example, in the forgoing embodiments and modifications, the spring component 50 is not limited to the configuration illustrated in FIG. 2, and a substantially M-shaped spring component 50A such as that illustrated in FIG. 13A or a spring component 50B which is in the general shape of a leftward-facing U (inverted C) such as that illustrated in FIG. 13B may be used.

The spring component 50A has a plate-like body portion 51A that is curved so as to project toward the core 320, the first arm portion 52a, the second arm portion 52b, the first holding portion 53a, and the second holding portion 53b. As with the spring component 50, with the spring component 50A, the first core 321 and the second core 322 are held together by being sandwiched between the body portion 51A and the first holding portion 53a and second holding portion 53b.

The spring component 50B is configured of a plate-like body portion 51B that comes into contact with the second core 322, a holding portion 53B that comes into contact with the first core 321, and an arm portion 52B connecting the body portion 51B and the holding portion 53B. With the spring component 50B, the first core 321 and the second core 322 are held together by being sandwiched between the body portion 51B and the holding portion 53B.

Figure 14A:
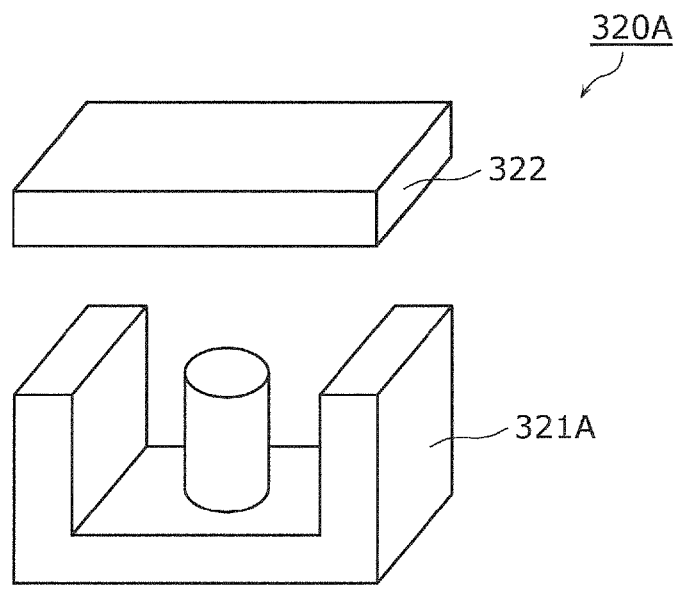
FIG. 14A is a diagram illustrating another configuration of a core in a lighting device according to Embodiment 1 of the present invention.
Figure 14B:
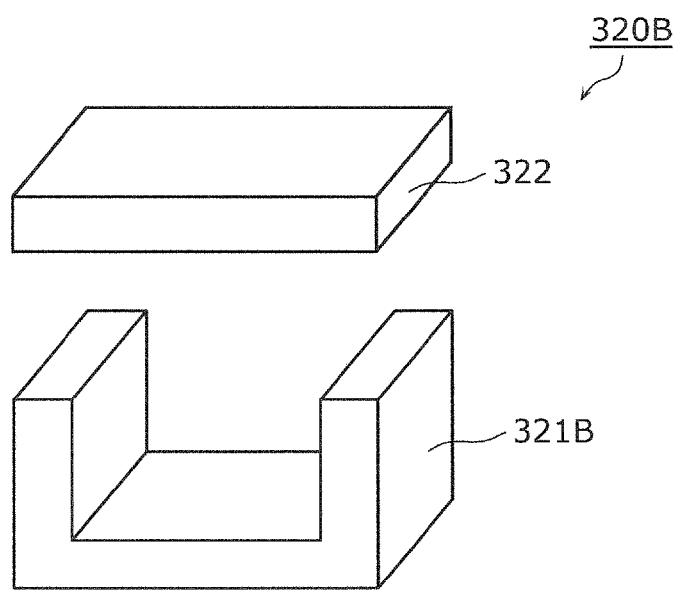
FIG. 14B is a diagram illustrating yet another configuration of a core in a lighting device according to Embodiment 1 of the present invention.

Furthermore, in the forgoing embodiments and modifications, the core 320 is not limited to the EI type such as that illustrated in FIG. 2, and an EIR type core 320A such as that illustrated in FIG. 14A or a CI type core 320B such as that illustrated in FIG. 14B may be used.

The core 320A includes a first core 321A and the second core 322. The first core 321A has a first outer leg portion and a second outer leg portion which have a rectangular cross-sectional shape, and a central leg portion which has a circular cross-sectional shape.

The core 320B includes a substantially C-shaped (U-shaped) first core 321B and the I-shaped second core 322. In other words, a core having only a pair of outer leg portions and no central leg portion may be used for the first core.

Furthermore, a core of the EE type, a PQI type, an RM type, or the like may be used for the core 320, that is, the shapes of the plural cores to be combined are varied. Moreover, by adjusting the length of the gap between the outer leg portions and the central leg portion of the core, the inductance value can be adjusted. It should be noted that combining cores with the same shape allows for the use of the same die, thereby allowing die cost to be reduced.

Figure 15A:
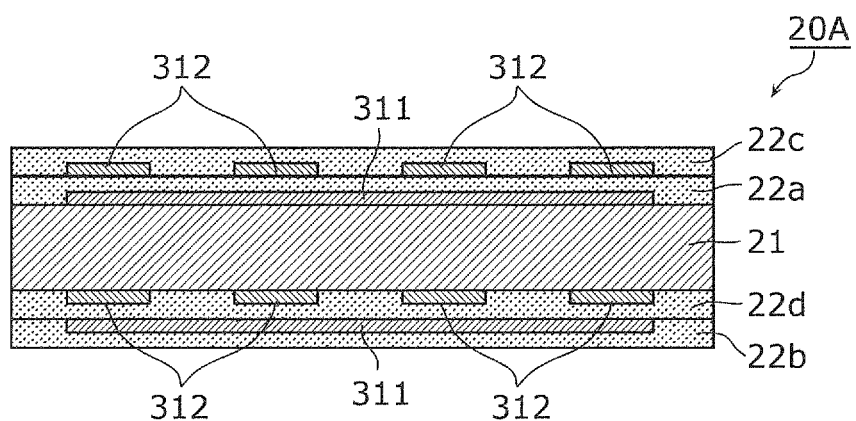
FIG. 15A is a diagram illustrating another configuration of a circuit board in a lighting device according to Embodiment 1 of the present invention.
Figure 15B:
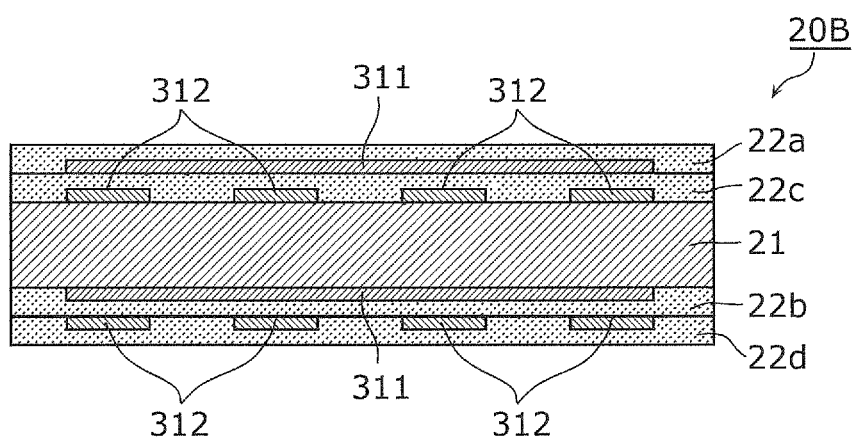
FIG. 15B is a diagram illustrating yet another configuration of a circuit board in a lighting device according to Embodiment 1 of the present invention.

Furthermore, in the forgoing embodiments and modifications, the circuit board 20 is not limited to the configuration illustrated in FIG. 3A and FIG. 3B, and a circuit board 20A such as that illustrated in FIG. 15A or a circuit board 20B such as that illustrated in FIG. 15B may be used.

For example, the circuit board 20A is different from the circuit board 20 in terms of the layering order of a first layer 22a to a fourth layer 22d. Here, each of the first layer 22A and the fourth layer 22d is formed on a different one of the two principal surfaces of a core substrate 21, and the third layer 22c and the second layer 22b are formed covering the first layer 22a and the fourth layer 22d, respectively.

Furthermore, in the circuit board 20B, each of the second layer 22b and the third layer 22c is formed on a different one of the two principal surfaces of the core substrate 21, and the first layer 22a and the fourth layer 22d are formed covering the third layer 22c and the second layer 22b, respectively.

Figure 16A:
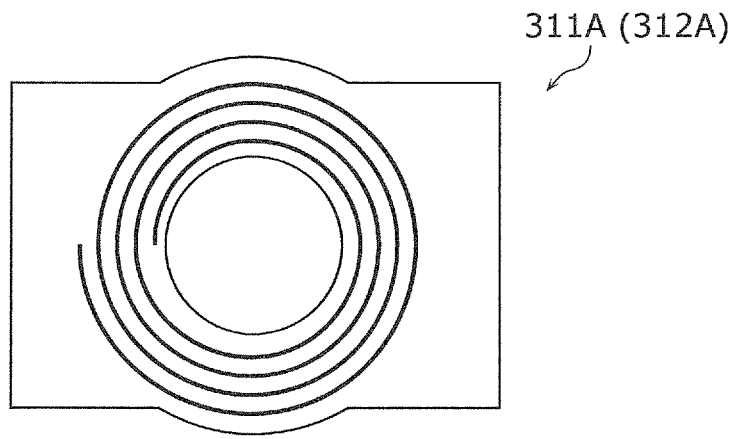
FIG. 16A is diagram illustrating another configuration of a winding pattern in a lighting device according to Embodiment 1 of the present invention.
Figure 16B:
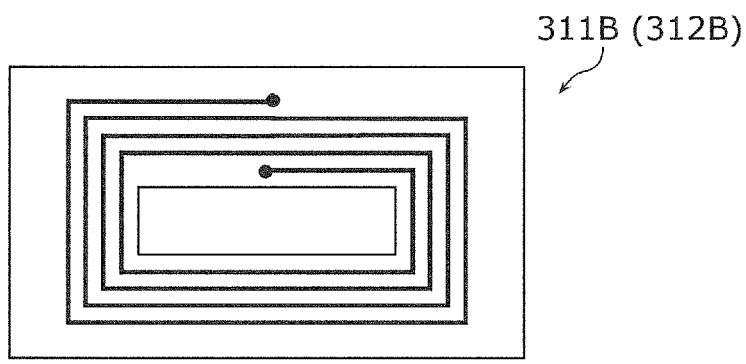
FIG. 16B is diagram illustrating yet another configuration of a winding pattern in a lighting device according to Embodiment 1 of the present invention.
Figure 16C:
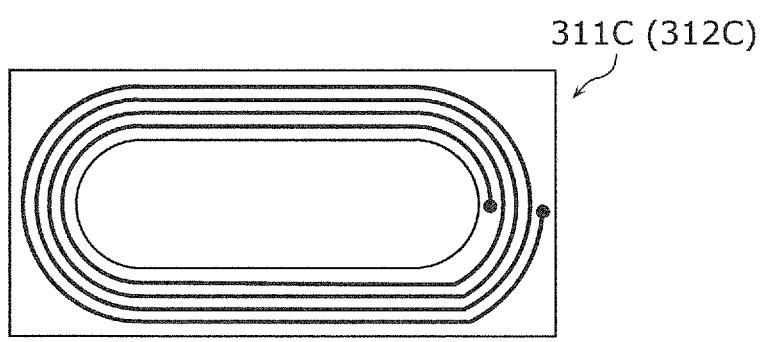
FIG. 16C is diagram illustrating still another configuration of a winding pattern in a lighting device according to Embodiment 1 of the present invention.

Furthermore, in the forgoing embodiments and modifications, the primary coil 311 and the secondary coil 312 of the winding patterns 310 formed on the circuit board 20 are not limited to the configuration illustrated in FIG. 3A, and a primary coil 311A and a secondary coil 312A of a pattern such as that illustrated in FIG. 16A, a primary coil 311B and a secondary coil 312B of a pattern such as that illustrated in FIG. 16B, or a primary coil 311C and a secondary coil 312C of a pattern such as that illustrated in FIG. 16C may be used.

Furthermore, although the circuit board 20 is mufti-layered in the forgoing embodiment and modifications, the circuit board 20 may be made from a single layer. In this case, if the winding patterns (primary coil and secondary coil) formed on the circuit board are magnetically coupled via the core 320, the winding patterns function as an inductance.

Furthermore, although the transformer 30 uses the winding patterns 310 formed on the circuit board 20 by patterning in the forgoing embodiments and modifications, a transformer which is configured by wrapping copper wires, or the like, around a bobbin may be used.

Furthermore, although an HID lamp is used as a light source in the forgoing embodiments and modifications, the light source may be a solid-state light-emitting element such as a light emitting diode (LED) or an organic electroluminescent (EL) element. In other words, the lighting device 1 may be configured to control the lighting of a semiconductor light-emitting element, such as an LED, as a light source (load).

Forms obtained by various modifications to the exemplary embodiments and modifications that can be conceived by a person of skill in the art as well as forms realized by arbitrarily combining structural components and functions in the exemplary embodiments and modifications which are within the scope of the essence of the present invention are included in the present invention.

The invention claimed is:
1. A lighting device comprising:
a circuit board placed on a base; and
a transformer provided in the circuit board,
wherein the transformer includes a winding pattern and a core, the winding pattern being formed on the circuit board, and the core having an outer leg portion,
the circuit board has an outer leg insertion portion through which the outer leg portion of the core is inserted,
the circuit board and the base have therebetween a gap which is air space, and
the base and at least a lateral face of the outer leg portion are bonded together by a first resin that is insertable from the outer leg insertion portion.

2. The lighting device according to claim 1,
wherein the outer leg portion consists of a pair of outer leg portions,
the outer leg insertion portion consists of a pair of outer leg insertion portions through which the pair of outer leg portions are respectively inserted, and
the first resin bonds together the base and a surface of one outer leg portion of the pair of outer leg portions, and is disposed on a surface of the core, from the one outer leg portion to a point up to an other outer leg portion of the pair of outer leg portions.

3. The lighting device according to claim 2,
wherein the core has a central leg portion located between the pair of outer leg portions, and
the first resin is disposed on the surface of the core, from the one outer leg portion to a point up to the central leg portion.

4. The lighting device according to claim 2,
wherein the base and a lateral face of the other outer leg portion are bonded together by a second resin that is insertable from one of the pair of outer leg insertion portions which corresponds to the other outer leg portion, and
the second resin is disposed on the surface of the core, from the other outer leg portion to a point up to the one outer leg portion.

5. The lighting device according to claim 1,
wherein the outer leg insertion portion is a hole penetrating through the circuit board.

6. The lighting device of claim 5, wherein the hole has a rectangular plan view shape, and a gap is present between the lateral face of the outer leg portion that has been inserted through the hole and a long side of the hole which is opposite the lateral face.

7. The lighting device according to claim 1,
wherein the outer leg insertion portion is a notch formed by cutting out a portion of an outer edge of the circuit board.

8. The lighting device according to claim 7,
wherein the notch is formed by cutting out a corner portion of the circuit board.

9. The lighting device according to claim 1,
wherein the first resin is further disposed between a bottom face of the core and a top face of the base.

10. A light fixture comprising:
the lighting device according to claim 1;
a housing; and
a light source housed inside the housing and whose lighting is controlled by the lighting device.

11. A vehicle comprising:
the light fixture according to claim 10; and
a vehicle body.

12. The lighting device of claim 1, wherein the first resin is an adhesive comprising silicone resin.

* * * * *